(12) United States Patent
Ueno

(10) Patent No.: US 11,136,047 B2
(45) Date of Patent: Oct. 5, 2021

(54) TACTILE AND AUDITORY SENSE PRESENTATION DEVICE

(71) Applicant: KABUSHIKI KAISHA TOKAI RIKA DENKI SEISAKUSHO, Aichi (JP)

(72) Inventor: Takashi Ueno, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 267 days.

(21) Appl. No.: 16/466,510

(22) PCT Filed: Dec. 1, 2017

(86) PCT No.: PCT/JP2017/043258
§ 371 (c)(1),
(2) Date: Jun. 4, 2019

(87) PCT Pub. No.: WO2018/110319
PCT Pub. Date: Jun. 21, 2018

(65) Prior Publication Data
US 2020/0079400 A1    Mar. 12, 2020

(30) Foreign Application Priority Data

Dec. 15, 2016    (JP) .............................. JP2016-242977

(51) Int. Cl.
*B60Q 9/00* (2006.01)
*B60W 50/16* (2020.01)
(Continued)

(52) U.S. Cl.
CPC ............. *B60W 50/16* (2013.01); *G06F 3/016* (2013.01); *G06F 3/0412* (2013.01); *G06F 3/167* (2013.01)

(58) Field of Classification Search
CPC ...... B60W 50/16; G06F 3/016; G06F 3/0412; G06F 3/167; G06F 3/03547; G06F 3/041;
(Continued)

(56) References Cited

U.S. PATENT DOCUMENTS 9,542,820 B2 * 1/2017 Moussette ............. H04M 19/04
9,830,784 B2 * 11/2017 Moussette ................ G08B 6/00
(Continued)

FOREIGN PATENT DOCUMENTS

JP    2005-332063 A    12/2005
JP    2006-007919 A    1/2006
(Continued)

*Primary Examiner* — Toan N Pham
(74) *Attorney, Agent, or Firm* — Roberts Calderon Safran & Cole P.C.

(57) ABSTRACT

A tactile and auditory sense presentation device includes an actuator configured to impart vibration to an operating surface on which an operation is performed, a sound output unit configured to output a sound, and a controller that is configured to present a cross-modal feedback by controlling the actuator such that the actuator applies the vibration to the operating surface as well as controlling the sound output unit such that the sound output unit outputs the sound at a timing of when the vibration is presented.

6 Claims, 4 Drawing Sheets

(51) Int. Cl.
  *G06F 3/01* (2006.01)
  *G06F 3/041* (2006.01)
  *G06F 3/16* (2006.01)

(58) Field of Classification Search
  CPC ................ G06F 3/16; B60K 2370/157; B60K 2370/158; B60K 35/00; B60R 16/02
  See application file for complete search history.

(56) References Cited

U.S. PATENT DOCUMENTS

2013/0016042 A1\* 1/2013 Makinen ............. G06F 3/04886
 345/168
2013/0307803 A1 11/2013 Koga et al.
2015/0348378 A1 12/2015 Obana et al.

FOREIGN PATENT DOCUMENTS

JP 2014-002796 A 1/2014
JP 2015-228054 A 12/2015

\* cited by examiner

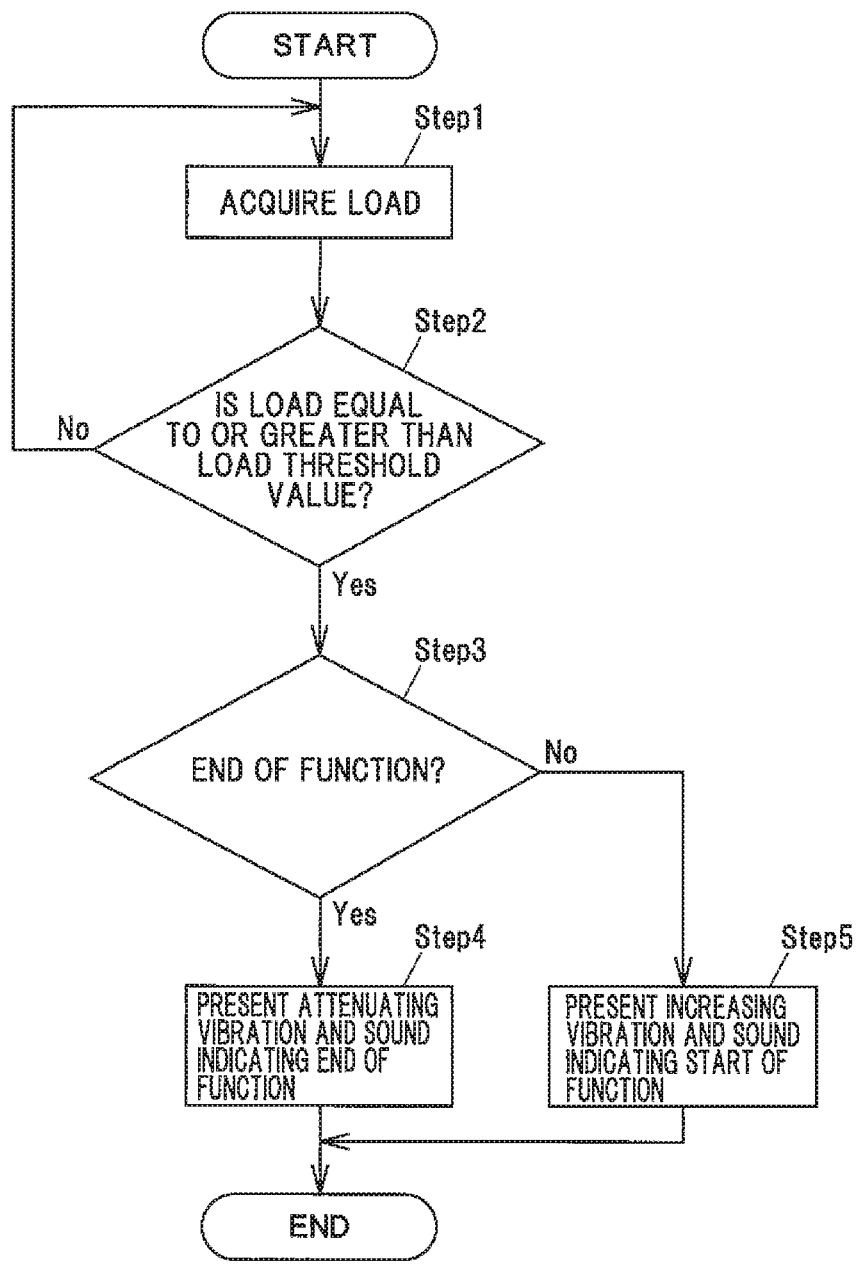

TACTILE AND AUDITORY SENSE PRESENTATION DEVICE

CROSS-REFERENCE TO RELATED APPLICATIONS

The present application is a U.S. National Phase of PCT/JP2017/043258 filed on Dec. 1, 2017 claiming priority to Japanese Patent Application No. 2016-242977 filed on Dec. 15, 2016. The disclosure of the PCT Application is hereby incorporated by reference into the present Application.

TECHNICAL FIELD

The present invention relates to a tactile and auditory sense presentation device.

BACKGROUND ART

An operation unit for a vehicle (Patent Document 1, for example) is known to be at least provided with: a thin film vibrating plate that is installed on a front side in a vehicle cabin; an operating part that is integrally formed with the thin film vibrating plate or is provided in close proximity to and overlaps with the thin film vibrating plate; a detector that detects that the operation part has been operated; a confirming vibration controller that performs confirming vibration, when the detector has detected that the operation part has been operated, by causing at least a region of the thin film vibrating plate corresponding to the operation part to vibrate so as to inform an occupant of the acceptance of the operation; and an acoustic output controller that performs acoustic output, when an acoustic signal is input, by causing the thin film vibrating plate to vibrate.

This operation unit for the vehicle can easily distinguish between a vibration tor the confirming vibration and an acoustic vibration resulting from the acoustic output, by making a distinction between a frequency band of the confirming vibration resulting from the thin film vibrating plate and a frequency band of the acoustic output.

CITATION LIST

Patent Document

Patent Document 1: JP 2006-7919 A

SUMMARY OF INVENTION

Technical Problem

With the operation unit for a vehicle disclosed in Patent Document 1, there is a possibility that an integrated feeling and a sense of unity of a tactile stimulation and an auditory stimulation may not be obtained.

An object of the invention is to provide a tactile and auditory sense presentation device that can improve an integrated feeling and a sense of unity of a tactile stimulation and an auditory stimulation.

Solution to Problem

A tactile and auditory sense presentation device according to an embodiment of the invention includes an actuator configured to impart vibration to an operating surface on which an operation is performed, a sound output unit configured to output a sound, and a controller configured to control the actuator such that the actuator applies the vibration to the operating surface, control the sound output unit such that the sound output unit outputs the sound when the vibration is presented, and present cross-modal feedback.

Advantageous Effects of Invention

According to an embodiment of the invention, a tactile and auditory sense presentation device can be provided that improves an integrated feeling and a sense of unity of tactile stimulation and auditory stimulation.

BRIEF DESCRIPTION OF DRAWINGS

FIG. 4 is a flowchart illustrating an example of operations of the tactile and auditory sense presentation device according to the embodiment.

DESCRIPTION OF EMBODIMENT

Overview of Embodiment

A tactile and auditory sense presentation device according to an embodiment includes an actuator configured to impart vibration to an operating surface on which an operation is performed, a sound output unit configured to output a sound, and a controller configured to control the actuator such that the actuator applies the vibration to the operating surface, control the sound output unit such that the sound output unit outputs the sound when the vibration is presented, and present cross-modal feedback.

Since this tactile and auditory sense presentation device causes the presentation timings of the vibration and the sound to be matched, in comparison with a case in which this configuration is not adopted, an integrated feeling and a sense of unity of tactile stimulation and auditory stimulation can be improved.

Embodiment

Overview of Tactile and Auditory Sense Presentation Device 1

Figure 1A:
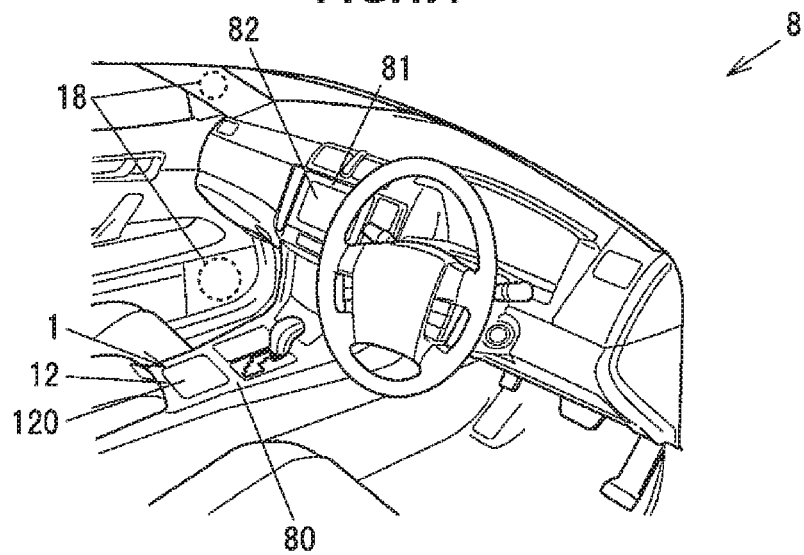
FIG. 1A is a schematic diagram illustrating an interior of a vehicle in which an example of a tactile and auditory sense presentation device according to an embodiment is installed.
Figure 1B:
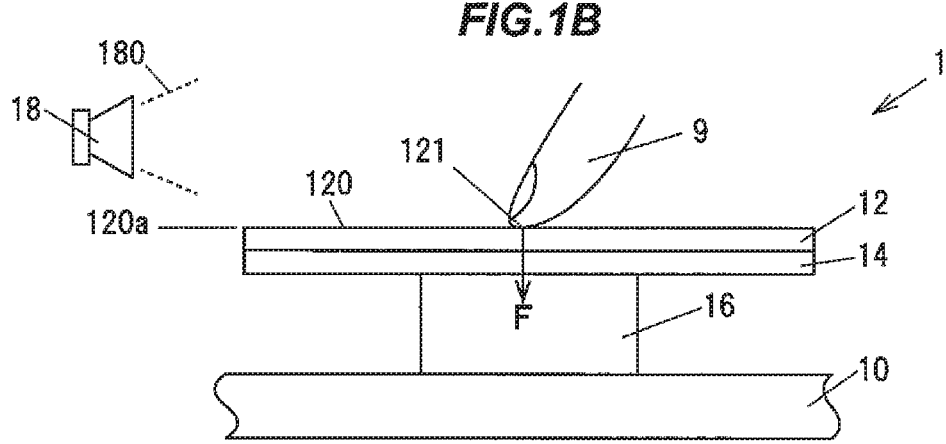
FIG. 1B is a schematic diagram illustrating an example of the tactile and auditory sense presentation device.
Figure 1C:
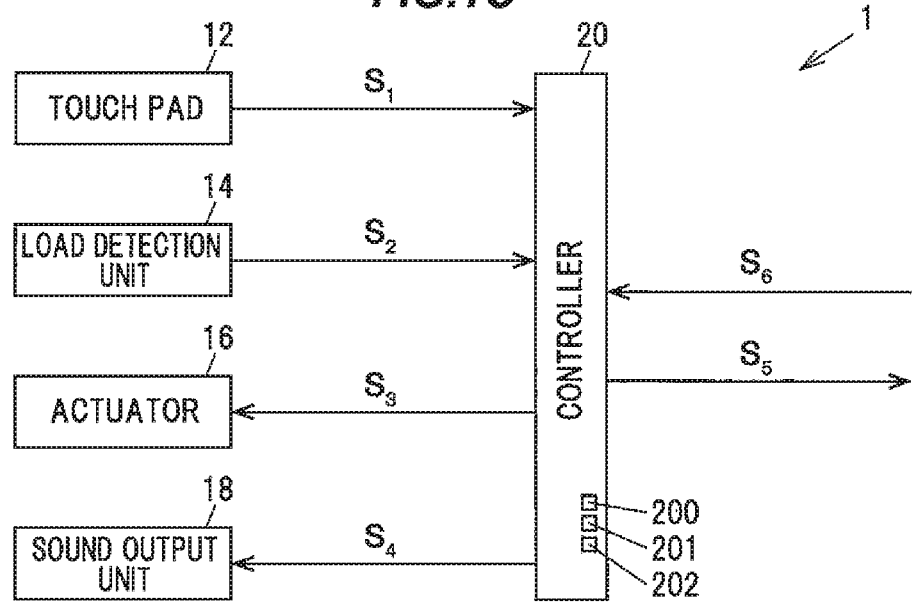
FIG. 1C is a block diagram illustrating an example of the tactile and auditory sense presentation device.
Figure 2:
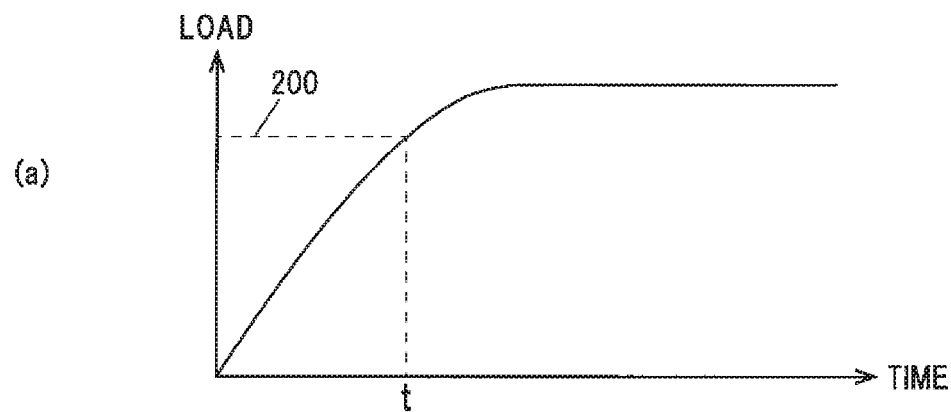
FIG. 2 is graphs, wherein (a) is a graph for illustrating an example of a load detected by a load detection unit of the tactile and auditory sense presentation device according to the embodiment and a load threshold value, (b) is a graph for illustrating an example of a driving signal output to an actuator, and (c) is a graph for illustrating an example of a sound signal output to a sound output unit.
Figure 2:
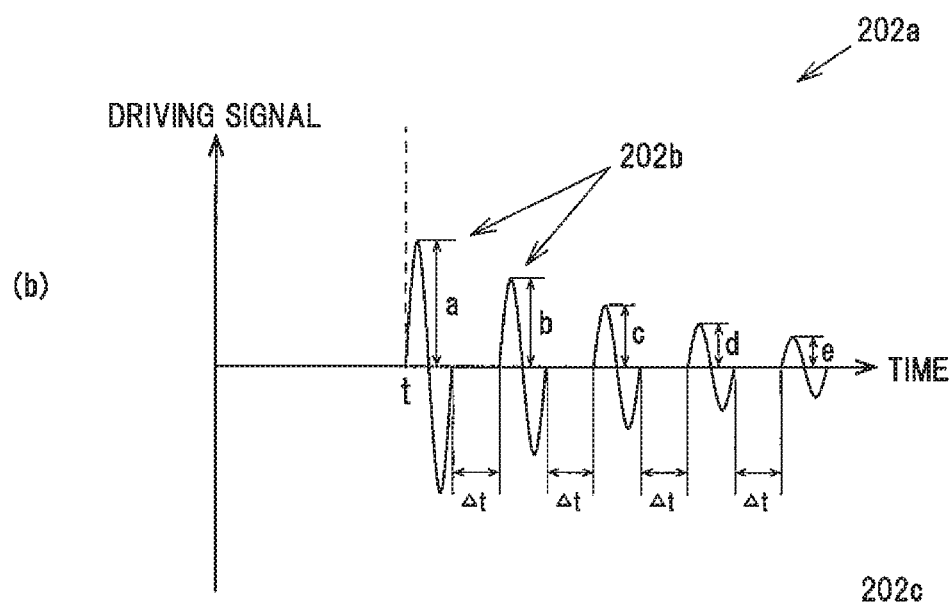
Figure 2:
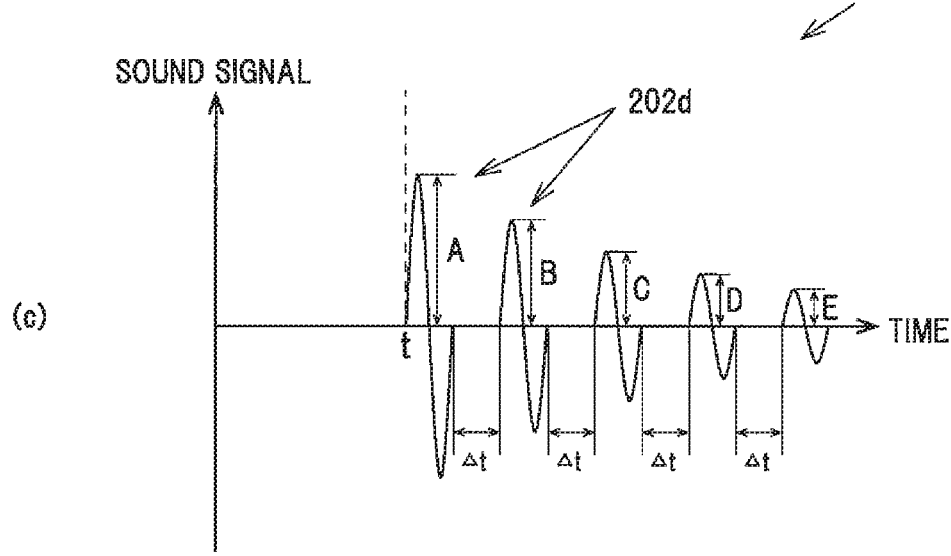

FIG. 1A is a schematic diagram illustrating an interior of a vehicle in which an example of a tactile and auditory sense presentation device according to the embodiment is installed, FIG. 1B is a schematic diagram illustrating an example of the tactile and auditory sense presentation device, and FIG. 1C is a block diagram illustrating an example of the tactile and auditory sense presentation device. FIG. 2 is graphs, wherein (a) is a graph for illustrating an example of a load detected by a load detection unit of the tactile and auditory sense presentation device according to the embodiment and a load threshold value, (b) is a graph for illustrating an example of a driving signal output to the actuator, and (c) is a graph for illustrating an example of a sound signal output to the sound output unit. In FIG. 2 (a), the horizontal axis represents tune, and the vertical axis represents the detected load. In FIG. 2 (b), the horizontal axis represents time, and the vertical axis represents the driving signal. In FIG. 2 (c), the horizontal axis represents time, and the vertical axis represents the sound signal. Note that a load F is positive in a downward direction of the page in FIG. 1B.

In the drawings associated with the following embodiment, ratios between elements in the drawings may be different from the actual ratios. In addition, in FIG. 1C, arrows indicate the flows of primary signals, information, and the like. Further, "A to B," which indicates a numerical value range, is used to mean that the range is A or greater and B or less.

As illustrated in FIG. 1A, a tactile and auditory sense presentation device 1 is disposed in a floor console 80 of a vehicle 8 such that an operating surface 120 is exposed, for example. For example, the tactile and auditory sense presentation device 1 is electromagnetically connected to an electronic device, which is an operation target mounted in the vehicle 8. In addition, the tactile and auditory sense presentation device 1 is a remote operation device that can carry out instructions, such as moving a cursor displayed on a display device 82 disposed in a center console 81, which is a display unit of the electronic device, and selecting, confirming, dragging, and dropping a displayed icon, and the like. Examples of the electronic device that is the operation target include a navigation device, an air conditioning device, music and video playback devices, and the like.

Further, the tactile and auditory sense presentation device 1 is configured to present feedback of tactile stimulation and auditory stimulation, namely, cross-modal feedback, to an operator by imparting vibration to the operating surface 120 in accordance with an operation performed on the operating surface 120 and outputting a sound.

Specifically, as illustrated in FIG. 1B to FIG. 2, the tactile and auditory sense presentation device 1 includes an actuator 16 configured to impart the vibration to the operating surface 120 on which the operation is performed, a sound output unit 18 configured to output a sound 180, and a controller 20 configured to control the actuator 16 such that the actuator 16 applies the vibration to the operating surface 120, control the sound output unit 18 such that the sound output unit 18 outputs the sound 180 when the vibration is presented, and present the cross-modal feedback.

Further, the tactile and auditory sense presentation device 1 of the present embodiment is provided with a load detection unit 14 configured to detect a load F that is applied when an operation of pushing the operating surface 120 is performed. Then, when the load F detected is equal to or greater than a load threshold value 201, the controller 20 is configured to control the actuator 16 so as to present a tactile stimulation, and control the sound output unit 18 so as to present an auditory stimulation.

Further, the tactile and auditory sense presentation device 1 of the present embodiment is provided with a touch pad 12 configured to detect coordinates of a detection target that comes into contact with or comes close to the operating surface 120.

When a function of the operation target is started as a result of an operation being performed on the operating surface 120, for example, the tactile and auditory sense presentation device 1 imparts, to the operating surface 120, a vibration that has a discretely and gradually increasing amplitude and also outputs the sound 180 that has an increasing sound pressure (amplitude), so as to present cross-modal feedback that indicates a start of the function.

Further, as illustrated in FIG. 2 (a) to (c), when the function of the operation target ends as a result of an operation being performed on the operating surface 120, for example, the tactile and auditory sense presentation device 1 imparts, to the operating surface 120, an attenuating vibration and outputs the sound 180 that has an attenuating sound pressure (amplitude), so as to present cross-modal feedback that indicates an end of the function.

In other words, as an example, the tactile and auditory sense presentation device 1 presents the cross-modal feedback indicating the start of the function of the operation target, and the cross-modal feedback indicating the end of the function of the operation target, each of which indicates a state of the operation target. Note that, as an example, the tactile and auditory sense presentation device 1 is configured to present the start of the function by presenting the attenuating vibration and the sound illustrated in FIG. 2 (b) and (c), in a descending order of the amplitude.

Although the operating surface 120 is the operating surface 120 of the touch pad 12, as illustrated in FIG. 1B, for example, the operating surface 120 is not limited to this example. The operating surface 120 may be a surface of a plate member or the like that is formed to imitate a switch button.

Configuration of Touch Pad 12

The touch pad 12 is a touch sensor that detects a touched position on the operating surface 120 when the operating surface 120 is touched by a part of the operator's body (an operating finger, for example) or a dedicated pen, for example. The operator can operate the connected electronic device by performing an operation on the operating surface 120, for example. A touch panel, such as a resistive film-type or an electrostatic capacitance-type touch panel, can be used as the touch pad 12, for example. As an example, the touch pad 12 of the present embodiment is the electrostatic capacitance-type touch sensor.

In the touch pad 12, a plurality of driving electrodes and a plurality of detection electrodes are disposed below the operating surface 120 so as to intersect with each other while maintaining their insulation properties. The touch pad 12 scans the plurality of driving electrodes and the plurality of detection electrodes, and periodically reads out an electrostatic capacitance, for example. Based on the read-out electrostatic capacitance, the touch pad 12 calculates coordinates of a detection point 121 at which an operating finger 9 has been detected.

Then, the touch pad 12 generates detection information S1 based on the coordinates of the detection point 121 calculated, and outputs the detection information S1 to the controller 20, for example. These coordinates are coordinates in a coordinate system set for the operating surface 120.

Configuration of Load Detection Unit 14

As illustrated in FIG. 1B, the load detection unit 14 is disposed on a back surface side of the touch pad 12 and is configured to detect the load F applied to the operating surface 120. The load F is positive when a load is applied in a pushing direction with respect to a reference position 120a where no load and no vibration is applied.

The load detection unit 14 is a strain gauge, for example. The load detection unit 14 generates load information S2 based on the load F detected, and outputs the load information S2 to the controller 20.

Configuration of Actuator 16

As illustrated in FIG. 1B, the actuator 16 is disposed on the back surface side of the operating surface 120. The actuator 16 is configured using a voice coil motor or a piezo element, for example.

The actuator 16 of the present embodiment is the voice coil motor disposed between a housing 10 and the load detection unit 14. The actuator 16 vibrates the operating surface 120 in upward and downward directions with respect to the reference position 120a based on a driving signal S3 output from the controller 20. The driving signal S3 that causes the operating surface 120 to be driven in the upward direction from the reference position 120a is depicted on an upper side of the graph illustrated in FIG. 2 (b). Further, the driving signal S3 that causes the operating surface 120 to be driven in the downward direction from the reference position 120a is depicted on a lower side of the graph illustrated in FIG. 2 (b).

Configuration of Sound Output Unit 18

As illustrated in FIG. 1A, the sound output unit 18 is configured to include a speaker disposed in a pillar or a door of the vehicle 8, for example. The sound output unit 18 outputs the sound 180 in accordance with a sound signal S4 output from the controller 20.

The sound 180 is a preset sound, such as a sound associated with a start or an end of a function, for example. As illustrated in FIG. 1C and FIG. 2 (c), the sound output unit 18 discretely outputs the sound 180 in accordance with the sound signal S4, for example.

Configuration of Controller 20

Figure 3A:
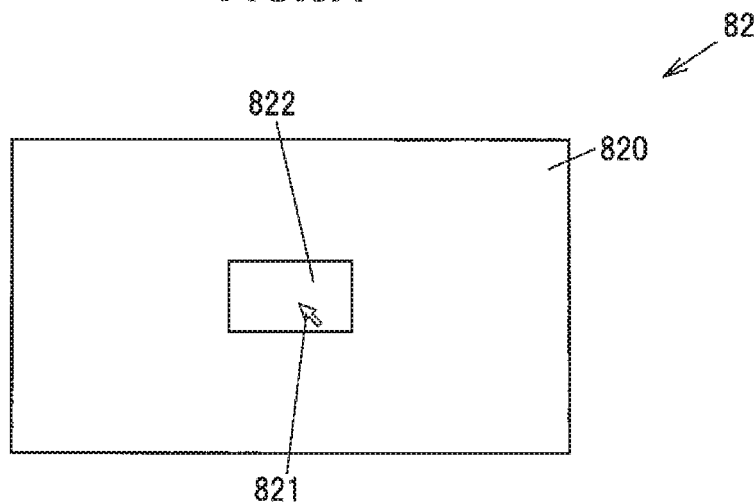
FIG. 3A is a schematic diagram illustrating an example of an icon that is displayed on a display device and indicates an assigned function is in an end state.
Figure 3B:
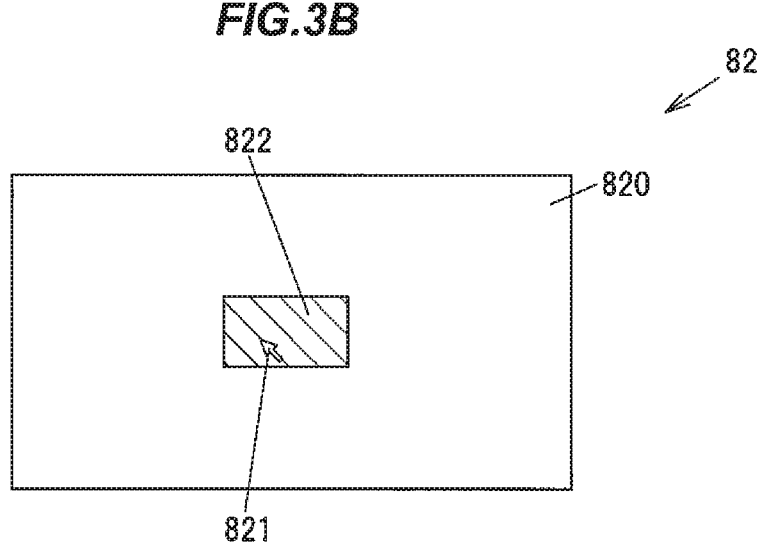
FIG. 3B is a schematic diagram illustrating an example of an icon that is displayed on a display device and indicates the assigned function is in a start state.

FIG. 3A is a schematic diagram illustrating an example of an icon displayed on the display device and indicating that an assigned function is in an end state, and FIG. 3B is a schematic diagram illustrating an example of an icon indicating that the function is in a start state. As an example, an icon 822 illustrated on a display screen 820 in FIG. 3A is configured such that a display of the icon 822 changes when a state of the assigned function of the operation target changes as a result of a selection and confirmation made by a cursor 821.

For example, the controller 20 is a microcomputer including a Central Processing Unit (CPU) that computes and processes acquired data according to stored programs, and a Random Access Memory (RAM) and a Read Only Memory (ROM) that are semiconductor memories. A program for operating the controller 20, state information 200, a load threshold value 201, and presentation pattern information 202 are stored in the ROM, for example.

Further, the controller 20 is configured to output, to the connected electronic device as the operation target, operation information S5 that includes information about the coordinates of the detection point 121 of the operating finger 9 and information about a pushing operation (a push operation) of the operating surface 120, based on the detection information S1 acquired from the touch pad 12 and the load information S2 acquired from the load detection unit 14, for example.

The state information 200 is information regarding the state of the operation target, for example. When the push operation is performed on the operating surface 120, for example, the controller 20 determines whether the function starts or ends, namely, whether it is in a first state or a second state, based on the state information 200, and presents the appropriate cross-modal feedback. As an example, the controller 20 generates the state information 200 based on designation information S6 acquired from the operation target.

As a modified example, the controller 20 may be configured to determine whether the function of the operation target starts or ends based on the designation information S6, and present the cross-modal feedback. Note that in a case where the tactile and auditory sense presentation device 1 is not provided with the load detection unit 14, the presentation of the cross-modal feedback indicating the start of the function and the presentation of the cross-modal feedback indicating the end of the function are performed based on the designation information S6 output from the operation target.

Further, in a case where a plurality of icons, to each of which a function is assigned, are displayed, for example, the state information 200 stores a current state of each of the plurality of icons.

As illustrated in FIG. 2 (a), the load threshold value 201 is a threshold value used for determining whether the tactile and auditory presentation is performed. For example, as illustrated in FIG. 2 (a) to (c), the controller 20 compares the detected load F with the load threshold value 201, and in a case where the load F is equal to or greater than the load threshold value 201 at a time t, the controller 20 generates the driving signal S3 having a tactile pattern 202a, and outputs the driving signal S3 to the actuator 16. At the same time, the controller 20 generates the sound signal S4 having an auditory pattern 202c, and outputs the sound signal S4 to the sound output unit 18.

The tactile pattern 202a and the auditory pattern 202c are generated based on the presentation pattern information 202. Note that the presentation pattern information 202 may be a function, for example.

As illustrated in FIG. 2 (b), the tactile pattern 202a for presenting the end of the function is a pattern that causes the operating surface 120 to vibrate intermittently. Also, the tactile pattern 202a is a pattern that causes the operating surface 120 to vibrate at a constant interval $\Delta t$. In other words, in the tactile pattern 202a, a plurality of solitary waveforms 202b are arranged at the constant interval $\Delta t$, and an amplitude of each of the solitary waveforms 202b does not attenuate. However, the amplitude of the solitary waveform 202b following one of the solitary waveforms 202b becomes smaller, and the tactile pattern 202a forms an overall attenuating pattern. As an example, the solitary waveform 202b is a sine wave. Note that the waveform is not limited to the sine wave, but may be one of various waveforms, such as a rectangular wave and a triangular wave.

Further, in the tactile pattern 202a for presenting the start of the function, the plurality of solitary waveforms 202b are arranged at the constant interval Δt, and the amplitude of each of the solitary waveforms 202b does not increase. However, the amplitude of the solitary waveform 202b following one of the solitary waveforms 202b becomes greater, and the tactile pattern 202a forms an overall increasing pattern.

As described above, the controller 20 causes the operating surface 120 to vibrate at the constant interval Δt, and causes the vibration applied to the operating surface 120 to increase or attenuate by increasing or decreasing the amplitude of each unit of waveform without increasing or attenuating the vibration waveform as a whole.

In a case where the solitary waveform 202b is the sine wave, according to results from experiments and the like, the tactile pattern 202a is configured as a combined pattern in which a frequency f1 is from 10 to 100 Hz, a wave period included in the solitary waveform 202b is from 0.5 to 2, the interval Δt is from 0.05 to 0.2 s, an attenuation ratio ζ1 is from 0.1 to 0.9, and a wavenumber is from 2 to 7. Note that, as described below, the auditory pattern 202c is generated as a pattern having characteristics similar to those of the tactile pattern 202a. Further, in a case of an increasing amplitude, an increase ratio is an inverse number of the attenuation ratio.

Specifically, in a case where the frequency f1 is less than 10 Hz, the tactile sensation is difficult to be perceived. Further, in a case where the frequency f1 is higher than 100 Hz, since the tactile sensation due to each individual vibration is clear, it is difficult to evoke a sensation of increasing or attenuating.

In a case where the wave included in the solitary waveform 202b has the wave period of less than 0.5, the perceived vibration is weak, and it is difficult to evoke the sensation of increasing or attenuating. Further, in a case where the wave included in the solitary waveform 202b has the wave period of longer than 2, the tactical sensation deteriorates and becomes unsuitable.

In a case where the interval Δt is less than 0.05 s, the interval between the solitary waveforms 202b becomes short, and the solitary waveforms 202b are not easily perceived to be a plurality of waveforms. Further, in a case where the interval Δt is longer than 0.2 s, since the interval is too long, the tactile sensation of increasing or attenuating cannot be obtained.

In a case where the attenuation ratio ζ1 is less than 0.1, since the first waveform is emphasized, the plurality of waveforms are perceived as one wave only, and the tactile sensation is similar to an usual click feeling and unsuitable. Further, in a case where the attenuation ratio ζ1 is greater than 0.9, the tactile sensation of increasing or attenuating cannot be obtained.

In a case where the wavenumber is 1, simple vibratory feedback similar to the usual click feeling is generated. Further, in a case where the wavenumber is greater than 8, a duration of the vibration becomes long, and the tactile sensation deteriorates and becomes unsuitable.

Based on the above-described results, as an example, the most suitable conditions for the tactile pattern 202a are preferably configured as a combined pattern in which the frequency f1 is 10 Hz, the wave period included in the solitary waveform 202b is 1, the interval Δt is 0.1 s, the attenuation ratio ζ1 is 0.7, and the wavenumber is 5. Note that, as illustrated in FIG. 2 (b), the attenuation ratio ζ is b/a=c/b=d/c=e/d. The attenuation ratio ζ1 of the solitary waveform 202b in FIG. 2 (b) is 0.7.

As illustrated in FIG. 2 (c), the auditory pattern 202c for presenting the end of the function is a pattern that causes the sound 180 to be output intermittently. Further, the auditory pattern 202c is a pattern that causes the sound 180 to be output at the same constant interval Δt as that of the vibration. In other words, in the auditory pattern 202c, a plurality of solitary waveforms 202d are arranged at the constant interval Δt, and the amplitude of each of the solitary waveforms 202d does not attenuate. However, the amplitude of the solitary waveform 202d following one of the solitary waveforms 202d becomes smaller, and the auditory pattern 202c is formed as an overall attenuating pattern. As an example, the solitary waveform 202d is a sine wave, similarly to the solitary waveform 202b of the tactile pattern 202a. Note that the solitary waveform 202d is not limited to the sine wave, and it is changed in accordance with the solitary waveform 202b of the tactile pattern 202a.

Further, in the auditory pattern 202c for presenting the start of the function, the plurality of solitary waveforms 202d are arranged at the constant interval Δt, and the amplitude of each of the solitary waveforms 202d does not increase. However, the amplitude of the solitary waveform 202d following one of the solitary waveforms 202d becomes greater, and the auditory pattern 202c is formed as an overall increasing pattern.

As described above, the controller 20 is configured to output the sound 180 at the constant interval Δt, and cause the sound 180 to increase or attenuate by increasing or attenuating an amplitude of each unit of waveform without increasing or attenuating the waveform of the sound 180 as a whole.

Note that a frequency f2 is from 10 to 5000 Hz in the auditory pattern 202c. Further, as illustrated in FIG. 2 (c), an attenuation ratio ζ2 of the auditory pattern 202c is B/A=C/B=D/C=E/D and is the same as the attenuation ratio ζ1 of the tactile pattern 202a.

The controller 20 causes the operator to feel gradually a sensation of the start of the function by discretely increasing the tactile stimulation and the auditory stimulation. The controller 20 causes the operator to feel gradually a sensation of the end of the function by discretely attenuating the tactile stimulation and the auditory stimulation.

When the function of the operation target ends, as illustrated in FIG. 2 (b) and (c), the controller 20 generates the driving signal S3 having the tactile pattern 202a that gradually attenuates, and outputs the driving signal S3 to the actuator 16. At the same time, the controller 20 generates the sound signal S4 having the auditory pattern 202c that gradually attenuates, and outputs the sound signal S4 to the sound output unit 18.

Further, when the function of the operation target starts, as an example, the controller 20 generates the driving signal S3 having a tactile pattern that causes the vibration to gradually increase, namely, a tactile pattern that is formed by inverting the tactile pattern 202a, and outputs the driving signal S3 to the actuator 16. At the same time, the controller 20 generates the sound signal S4 having an auditory pattern that causes the sound 180 to gradually increase, namely, an auditory pattern that is formed by inverting the auditory pattern 202c, and outputs the sound signal S4 to the sound output unit 18.

For example, as illustrated in FIG. 3A, when the function of the icon 822 is in the end state, in a case where the push operation is performed on the operating surface 120 in a state in which the icon 822 is selected by the cursor 821, the controller 20 generates the driving signal S3 and the sound signal S4 presenting the start state of the function based on the presentation pattern information 202, outputs the driving signal S3 and the sound signal S4 to the actuator 16 and the sound output unit 18, and presents the start of the function.

Further, for example, as illustrated in FIG. 3B, when the push operation is performed on the operating surface 120 in a state in which the icon 822, the function of which has been started, is selected by the cursor 821, the controller 20 generates the driving signal S3 and the sound signal S4 presenting the end of the function based on the presentation pattern information 202, outputs the driving signal S3 and the sound signal S4 to the actuator 16 and the sound output unit 18, and presents the end of the function.

Next, an example of operations of the tactile and auditory sense presentation device 1 of the present embodiment will be described with reference to a flowchart in FIG. 4. Here, a case will be described in which the first state or the second state of the function of the operation target is presented as a result of the operating surface 120 being pushed.

Operations

The controller 20 of the tactile and auditory sense presentation device 1 acquires the load information S2 from the load detection unit 14 (step 1), and monitors whether or not the load F exceeds the load threshold value 201. In a case where "Yes" is established at step 2, namely, when the detected load. F exceeds the load threshold value 201 (Yes at step 2), the controller 20 verifies whether the state of the operation target is the start of the function or the end of the function with reference to the state information 200.

In a case of the end of the function (Yes at step 3), the controller 20 generates the driving signal S3 and the sound signal S4 that cause the vibration and the sound 180 to discretely and gradually attenuate, outputs the driving signal S3 and the sound signal S4 to the actuator 16 and the sound output unit 18, and presents the attenuating vibration and sound 180 (step 4).

Specifically, based on the presentation pattern information 202, the controller 20 generates the driving signal S3 that is based on the discretely and gradually attenuating tactile pattern 202a, and outputs the driving signal S3 to the actuator 16. At the same time, the controller 20 generates the sound signal S4 that is based on the discretely and gradually attenuating auditory pattern 202c, and outputs the sound signal S4 to the sound output unit 18. The controller 20 presents the cross-modal feedback indicating the end of the function using the tactile stimulation and the auditory stimulation, and ends the operations thereof.

Here, at step 3, in a case of the start of the function (No at step 3), the controller 20 generates the driving signal S3 and the voice signal S4 that cause the vibration and the sound 180 to discretely and gradually increase, outputs the driving signal S3 and the sound signal S4 to the actuator 16 and the sound output unit 18, and presents the increasing vibration and sound 180 (step 5).

Specifically, based on the presentation pattern information 202, the controller 20 generates the driving signal S3 that has a pattern formed by inverting the tactile pattern 202a or the like such that the driving signal S3 discretely and gradually increases, and outputs the driving signal S3 to the actuator 16. At the same time, the controller 20 generates the sound signal S4 that has a pattern formed by inverting the auditory pattern 202c or the like such that the sound signal S4 discretely and gradually increases, and outputs the sound signal S4 to the sound output unit 18. The controller 20 presents the cross-modal feedback indicating the start of the function using the tactile stimulation and the auditory stimulation, and ends the operations thereof.

Effect of Embodiment

The tactile and auditory sense presentation device 1 according to the present embodiment can present the cross-modal feedback in which the integrated feeling and the sense of unity of the tactile stimulation and the auditory stimulation are improved in comparison with the case without this configuration, by matching the timings of the tactile stimulation generated by the vibration and the auditory stimulation generated by the sound 180.

In the tactile and auditory sense presentation device 1, the solitary waveform of the vibration and the sound 180 (the solitary waveform 202b and the solitary waveform 202d) that is the unit of waveform, does not continuously increase or attenuate, and is presented at the constant interval Δt, and the solitary waveform following one of the solitary waveforms increases or attenuates with respect to the one of the solitary waveforms, such that the solitary waveforms increase or attenuate overall. Thus, in comparison with the case in which this configuration is not adopted, the cross-modal feedback associated with the increase or the attenuation is more easily recognized by the operator.

Further, the tactile and auditory sense presentation device 1 can present the cross-modal feedback indicating that the function of the operation target is switched from the first state to the second state, or from the second state to the first state as a result of the pushing operation.

Although several embodiments of the invention and modified examples thereof have been described above, these embodiments and modified examples are merely examples, and the invention according to claims is not intended to be limited thereto. Such novel embodiments and modified examples can be implemented in various other forms, and various omissions, substitutions, changes, and the like can be made without departing from the spirit and scope of the invention. In addition, all combinations of the features described in these embodiments and modified examples are not necessary to solve the problem of the invention. Furthermore, these embodiments and modified examples are included within the spirit and scope of the invention and also within the scope of the invention described in the claims and equivalents thereof.

REFERENCE SIGNS LIST

1 Tactile and auditory sense presentation device
14 Load detection unit
16 Actuator
18 Sound output unit
20 Controller
120 Operating surface
202a Tactile pattern
202b Solitary waveform
202c Auditory pattern
202d Solitary waveform

The invention claimed is:

1. A tactile and auditory sense presentation device, comprising:
   an actuator configured to impart vibration to an operating surface on which an operation is performed;
   a sound output unit configured to output a sound; and
   a controller that is configured to present a cross-modal feedback by controlling the actuator such that the actuator applies the vibration to the operating surface as well as controlling the sound output unit such that the sound output unit outputs the sound at a timing of when the vibration is presented, wherein the controller is configured to present the cross-modal feedback indicating a start or an end of a function of an operation target by controlling the actuator such that the actuator applies a vibration that increases or attenuates to the operating surface, control the sound output unit such that the sound output unit outputs a sound that increases or attenuates concurrently with the vibration.

2. The tactile and auditory sense presentation device according to claim 1, wherein the controller is configured to cause the operating surface to intermittently vibrate, and cause the sound to be intermittently output.

3. The tactile and auditory sense presentation device according to claim 1, wherein the controller is configured to cause the vibration applied to the operating surface to increase or attenuate by causing the operating surface to vibrate at a constant interval and making a tactile pattern that causes an amplitude of each of a solitary waveform, which is a unit of waveform, to be increased or decreased, without increasing or attenuating the vibration waveform as a whole, and wherein the controller is configured to cause the sound to increase or attenuate by outputting the sound according to the constant interval and making an auditory pattern that causes an amplitude of each of a solitary waveform, which is a unit of waveform, to be increased or decreased, without increasing or attenuating the sound waveform as a whole.

4. The tactile and auditory sense presentation device according to claim 3, wherein the solitary waveform of the tactile pattern is a sine wave, a rectangular wave, or a triangular wave, and wherein the solitary waveform of the auditory pattern is a waveform corresponding to the solitary waveform of the tactile pattern.

5. The tactile and auditory sense presentation device according to claim 4, wherein where the solitary waveform of the tactile pattern is the sine wave, the tactile pattern is configured as a combined pattern in which a frequency f is from 10 to 100 Hz, a wave period included in the solitary waveform is from 0.5 to 2, an interval $\Delta t$ is from 0.05 to 0.2 s, an attenuation ratio $\zeta$ is from 0.1 to 0.9, and a wavenumber is from 2 to 7.

6. The tactile and auditory sense presentation device according to claim 1, further comprising a load detection unit configured to detect a load applied when a pushing operation is performed on the operating surface, wherein the controller is configured to present the cross-modal feedback by controlling the actuator and the sound output unit if the load detected is not less than a load threshold value.

* * * * *